US011338705B2

(12) United States Patent
Cha et al.

(10) Patent No.: US 11,338,705 B2
(45) Date of Patent: May 24, 2022

(54) SEAT ASSEMBLY OF VEHICLE

(71) Applicants: Hyundai Motor Company, Seoul (KR); Kia Motors Corporation, Seoul (KR)

(72) Inventors: Dong Eun Cha, Hwaseong-si (KR); Jin Ho Hwang, Cheonan-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/094,443

(22) Filed: Nov. 10, 2020

(65) Prior Publication Data
US 2022/0024356 A1    Jan. 27, 2022

(30) Foreign Application Priority Data
Jul. 22, 2020   (KR) .................... 10-2020-0091123

(51) Int. Cl.
| | |
|---|---|
| *B60N 2/12* | (2006.01) |
| *B60N 2/20* | (2006.01) |
| *B60N 3/00* | (2006.01) |
| *B60R 11/02* | (2006.01) |
| *B60R 11/00* | (2006.01) |

(52) U.S. Cl.
CPC ............... *B60N 2/12* (2013.01); *B60N 2/20* (2013.01); *B60N 3/002* (2013.01); *B60R 11/0235* (2013.01); *B60R 2011/008* (2013.01); *B60R 2011/0012* (2013.01)

(58) Field of Classification Search
CPC .. B60N 2/12; B60N 2/20; B60N 3/001; B60N 3/002; B60R 11/0235; B60R 2011/012; B60R 2011/008; B60R 2011/0042
USPC .......................................................... 297/135
See application file for complete search history.

(56) References Cited

U.S. PATENT DOCUMENTS

| | | | | | |
|---|---|---|---|---|---|
| 2,611,420 | A | * | 9/1952 | Diehl ..................... | A47C 7/563 297/344.14 |
| 4,941,709 | A | * | 7/1990 | Moller .................... | A61B 6/04 297/311 |
| 5,967,609 | A | * | 10/1999 | Potter .................... | A47C 1/027 297/325 |
| 6,106,065 | A | * | 8/2000 | Carroll ................. | A47C 1/0347 297/325 |
| 6,334,648 | B1 | * | 1/2002 | Girsberger ........... | B60N 2/4221 297/216.19 |

(Continued)

FOREIGN PATENT DOCUMENTS

KR          10-1635606 B1      7/2016

*Primary Examiner* — Mark R Wendell
(74) *Attorney, Agent, or Firm* — Morgan, Lewis & Bockius LLP (57) ABSTRACT

A seat assembly of a vehicle may include a support having a lower end portion connected to a floor of the vehicle; a seat frame having a connection portion provided above the support and having an entire slope which is changed by a curvature of the connection portion when the connection portion is slid, the connection portion being formed in a curved line or a curved surface; and a seat mounted on the seat frame and configured for implementing reclining by having a slope which is changed together with the seat frame when the seat frame is slid on the support.

17 Claims, 4 Drawing Sheets

(56) References Cited

U.S. PATENT DOCUMENTS

| | | | | |
|---|---|---|---|---|
| 8,936,315 B2* | 1/2015 | Fienup | .................. | A61G 15/02 |
| | | | | 297/330 |
| 9,327,624 B1* | 5/2016 | Alsaif | .................... | B60N 2/509 |
| 9,763,524 B2* | 9/2017 | Hopke | ................ | A47D 13/105 |
| 10,232,744 B2* | 3/2019 | Meister | .................. | B60N 2/838 |
| 2004/0188979 A1* | 9/2004 | Bernatsky | ............ | A61G 5/1075 |
| | | | | 280/304.1 |
| 2005/0242634 A1* | 11/2005 | Serber | ................ | B60N 2/0745 |
| | | | | 297/216.1 |
| 2006/0055214 A1* | 3/2006 | Serber | ................ | B60N 2/1846 |
| | | | | 297/216.1 |

* cited by examiner

SEAT ASSEMBLY OF VEHICLE

CROSS REFERENCE TO RELATED APPLICATION

The present application claims priority to Korean Patent Application No. 10-2020-0091123, filed Jul. 22, 2020, the entire contents of which is incorporated herein for all purposes by this reference.

BACKGROUND OF THE INVENTION

Field of the Invention

The present invention relates to a seat assembly of a vehicle which is movable inside and outside the vehicle and implements reclining of a seat by having a slope that changes with a seat frame when the seat frame is slid on the support.

Description of Related Art

A seat is provided in a vehicle for a driver to seat and drive or for another passenger to seat and take a break. A conventional seat of the vehicle has limitations in that it is possible to move back and forth inside the vehicle, but a moving range is very limited, and reclining of a backrest is possible, but the driver or passenger may not change their posture significantly from a basic seating posture.

As autonomous vehicles become commercially available in the future, the driver is not required. Accordingly, the passengers on board the vehicle will perform various activities, such as taking a break or doing business in a more comfortable posture while the vehicle is moving. However, there will be a lot of inconvenience for passengers accommodated on the conventional seat of the vehicle to perform such various activities.

Therefore, there is a demand for a vehicle seat that allows more freedom of movement inside the vehicle and allows the passengers accommodated on the seat to take a more comfortable posture and perform various activities.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a seat assembly of a vehicle which is movable inside and outside the vehicle, allows passengers to take a more comfortable posture on a seat by having a slope that changes smoothly as the entire cocoon-type seat frame is slid, and may promote convenience of the passengers by having a display and a table.

According to various exemplary embodiments of the present invention, a seat assembly of a vehicle includes: a support having a lower end portion connected to a floor of the vehicle; a seat frame having a connection portion provided above the support and having an entire slope which is changed by a curvature of the connection portion when the connection portion is slid, the connection portion being formed in a curved line or a curved surface; and a seat mounted on the seat frame and configured for implementing reclining by having a slope which is changed together with the seat frame when the seat frame is slid on the support.

The seat frame may have a hemispherical or cocoon-type structure, the connection portion may be formed in a curved line or a curved surface along an external surface of the seat frame, and the connection portion and the seat frame are integrally slid, so that the entire slope of the seat frame may be changed.

The seat frame may have a shape in which a front portion is opened and an internal space is formed, and the seat is mounted in the internal space of the seat frame so that when a passenger seats on the seat, the seat frame may wrap the rear and side surfaces of the passenger.

The connection portion may be formed to face a plurality of directions, and as the seat frame is slid in the plurality of directions, the slop of the seat frame may be changed in the plurality of directions.

The connection portion may be a guide rail formed on the seat frame, and the guide rail is formed in a curved line or a curved surface and is slid on the support, so that the slope of the seat frame may be changed.

A fixing portion may be provided in the support or the connection portion, and as the fixing portion selectively fixes the support and the connection portion, the slope of the seat frame may be selectively fixed according to an operation of the fixing portion.

A lower end portion of the support may be movable on the floor along a guide groove provided on the floor of the vehicle, and the guide groove may be formed to wrap the lower end portion of the support to prevent the support from being separated upwards.

One end portion of the guide groove may extend toward an opening portion in which a door of the vehicle is provided and may be connected to an outside of the vehicle, and the seat frame may be movable in and out of the vehicle through the one end portion of the guide groove.

When the floor is inclined, the seat frame is slid in an opposite direction by a slope of the floor, so that the seat provided in the seat frame may be maintained horizontally with respect to the ground.

A display may be provided on the seat frame, and the display may be selectively exposed to have a slope which is changed according to a passenger's eye level.

The seat frame may be provided with a left table and a right table, and the left table and the right table may be selectively exposed to form one table when both tables are coupled.

The left table and the right table may be provided with magnets, when the magnet of one table protrudes and is attached to the magnet in a groove formed in the other table, both tables may be coupled, and when the magnets are detached by a spring provided at the rear side of the protruding magnet, both tables may be separated.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
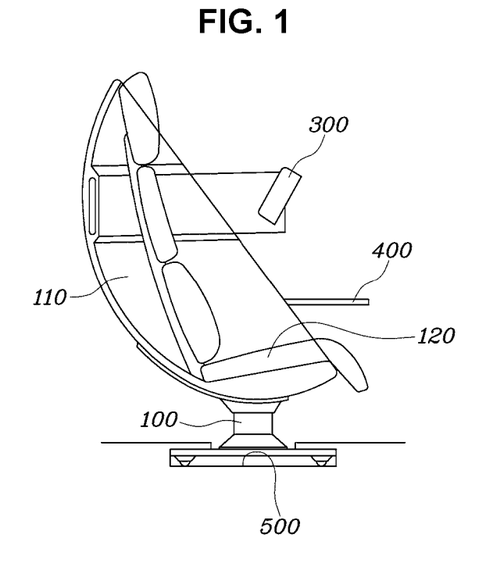
FIG. 1 is a side view of a seat assembly of a vehicle according to various exemplary embodiments of the present invention.

FIG. 1 is a side view of a seat assembly of a vehicle according to various exemplary embodiments of the present invention.

Figure 2A:
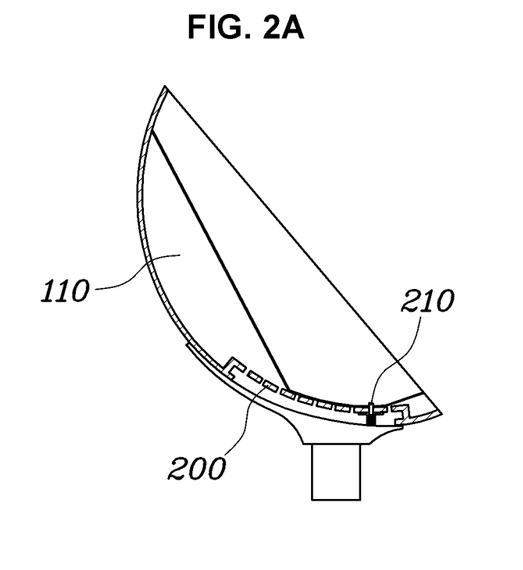
FIG. 2A and FIG. 2B are enlarged views of a portion connecting a seat frame and a support of the seat assembly of the vehicle according to various exemplary embodiments of the present invention.
Figure 2B:
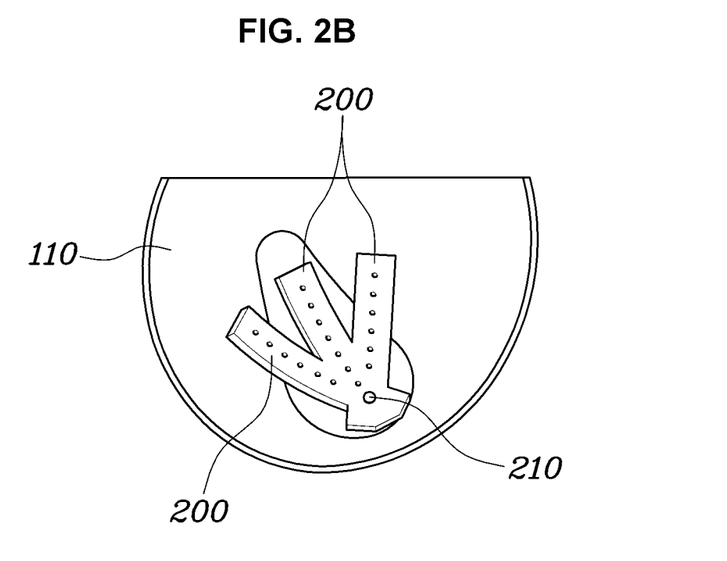

FIG. 2A and FIG. 2B are enlarged views of a portion connecting a seat frame and a support of the seat assembly of the vehicle according to various exemplary embodiments of the present invention.

Figure 3:
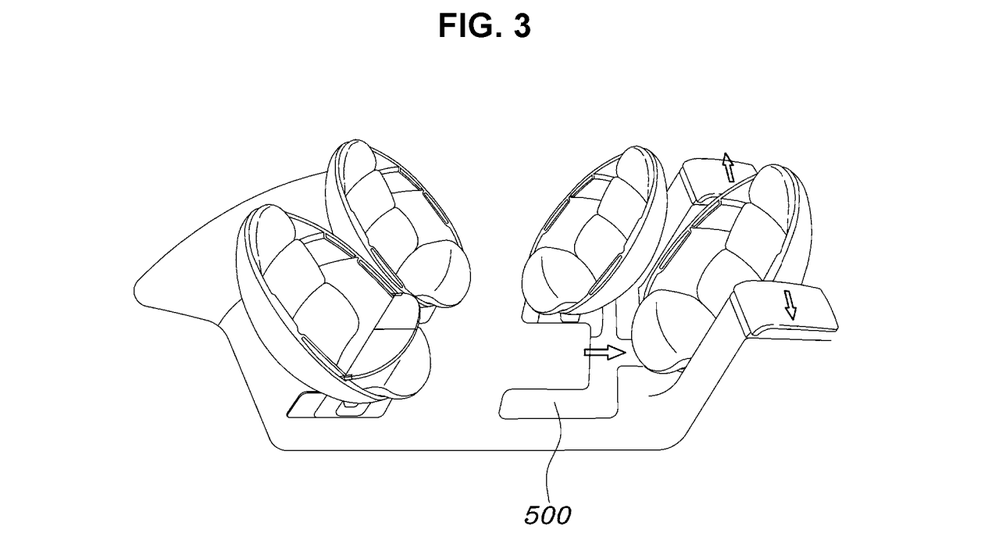
FIG. 3 is a view exemplarily illustrating that the seat assembly of the vehicle according to various exemplary embodiments of the present invention moves along a guide groove in the vehicle.

FIG. 3 is a view exemplarily illustrating that the seat assembly of the vehicle according to various exemplary embodiments of the present invention moves along a guide groove in the vehicle.

Figure 4:
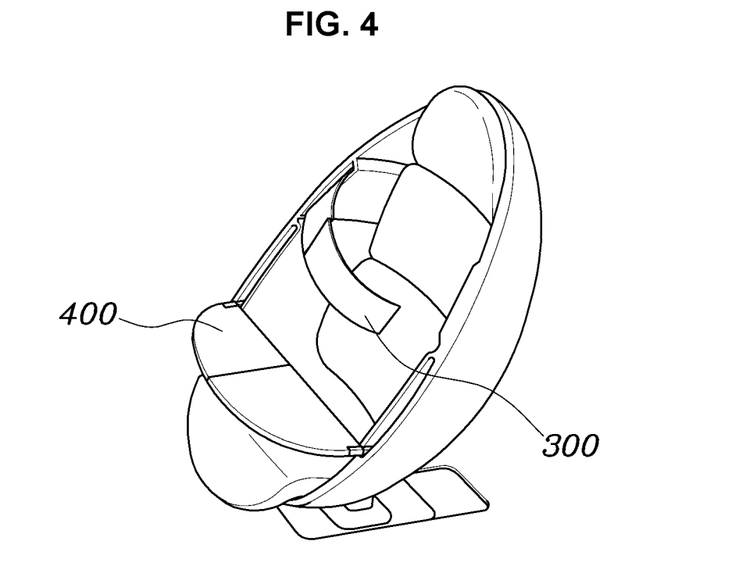
FIG. 4 is a view exemplarily illustrating a state in which a display and a table are exposed in the seat assembly of the vehicle according to various exemplary embodiments of the present invention.

FIG. 4 is a view exemplarily illustrating a state in which a display and a table are exposed in the seat assembly of the vehicle according to various exemplary embodiments of the present invention.

Figure 5:
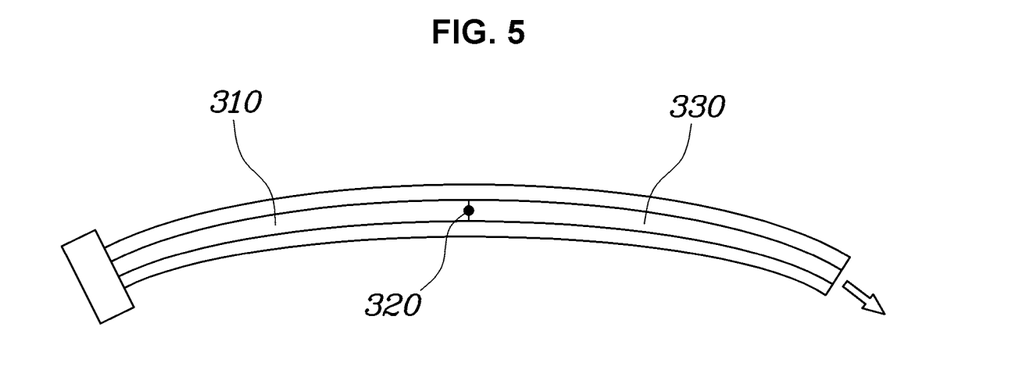
FIG. 5 is a view exemplarily illustrating a structure of the display of the seat assembly of the vehicle according to various exemplary embodiments of the present invention.

FIG. 5 is a view exemplarily illustrating a structure of the display of the seat assembly of the vehicle according to various exemplary embodiments of the present invention.

Figure 6:
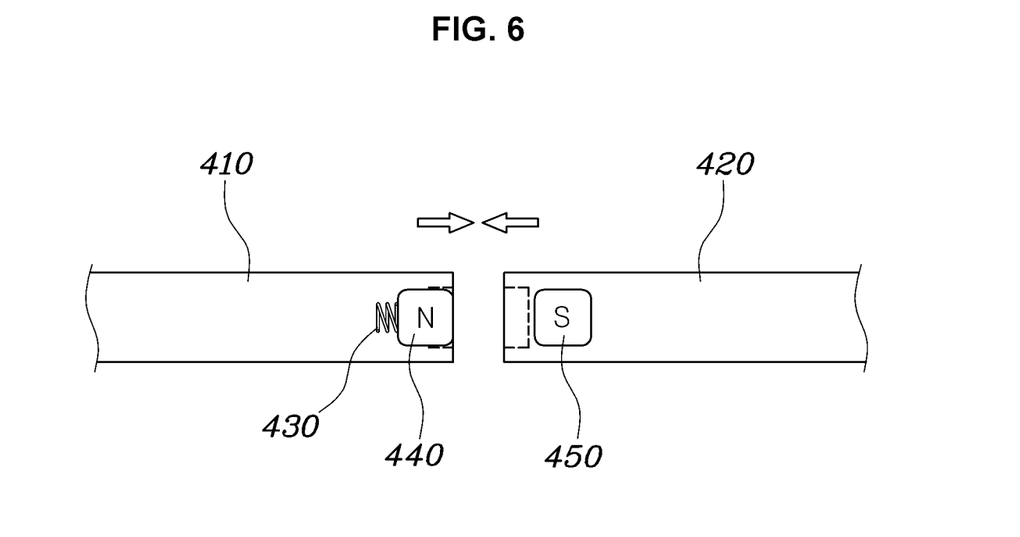
FIG. 6 is a view exemplarily illustrating a state in which both side tables of the seat assembly of the vehicle according to various exemplary embodiments of the present invention are coupled.

FIG. 6 is a view exemplarily illustrating a state in which both side tables of the seat assembly of the vehicle according to various exemplary embodiments of the present invention are coupled.

FIG. 1 is a side view of a seat assembly of a vehicle according to various exemplary embodiments of the present invention. A seat assembly of a vehicle according to various exemplary embodiments of the present invention includes a support 100 having a lower end portion connected to a floor of the vehicle; a seat frame 110 having a connection portion provided above the support 100 and having an entire slope which is changed by a curvature of the connection portion when the connection portion is slid, the connection portion being formed in a curved line or a curved surface; and a seat 120 for implementing reclining by having a slope which is changed together with the seat frame 110 when the seat frame 110 is slid.

A conventional seat is only configured for limited movement in forward and backward directions, and has a limited change in an angle of a backrest even when reclining. Accordingly, it is difficult for passengers to use a space in the vehicle, and there is discomfort due to a limited posture. The seat assembly of the vehicle according to various exemplary embodiments of the present invention has a structure different from the conventional seat, and as a seat assembly of the vehicle, it is possible to move inside and outside the vehicle, the connection portion between the support 100 and the seat frame 110 is formed in a curved line or a curved surface so that the entire seat frame 110 is slid, and reclining is implemented.

The seat frame 110 is positioned on an upper end portion of the support 100, and the connection portion connected to the support 100 is formed in the curved line or the curved surface on an external surface of the seat frame 110. The connection portion is slid in a certain direction based on the support 100. Accordingly, the entire seat frame 110 moves and the slope thereof changes, and thus the slope of the seat 120 provided inside the seat frame 110 also changes.

In other words, unlike the conventional seat that implements the reclining by changing the angle of the backrest, the seat assembly of the vehicle according to various exemplary embodiments of the present invention implements the reclining by moving the entire seat frame 110. Therefore, the passengers will be able to use the vehicle more comfortably by taking a lying posture on the seat.

Furthermore, in the seat assembly of the vehicle according to various exemplary embodiments of the present invention, a frame support for supporting the seat frame 110 may be provided at the upper end portion of the support 100. The frame support is formed to spread widely along the surface of the seat frame 110 in the support 100 to support the seat frame 110 more stably and wider, and as the connection portion provided on the seat frame 110 is slid along one side of the frame support, a slope of the seat frame 110 may be changed. At the upper end portion of the support 100, a protrusion portion which may be slid by being engaged with the connection portion formed on the seat frame 110 while supporting the seat frame 110 is formed on one side of the frame support. Therefore, the connection portion of the seat frame 110 is supported by the frame support and at the same time, is slid based on the protrusion portion of the frame support, and a slope thereof may be changed.

Meanwhile, in the seat assembly of the vehicle according to various exemplary embodiments of the present invention, the seat frame 110 has a hemispherical or cocoon-type structure, the connection portion is formed in a curved line or a curved surface along the external surface of the seat frame 110, and the connection portion and the seat frame are integrally slid, so that the entire slope of the seat frame may be changed. When the seat frame 110 has the hemispherical or cocoon-type structure, a connection portion having a curved line or curved surface shape may be formed on the external surface of the seat frame 110 with the same curvature as the seat frame 110. Therefore, when the passenger adjusts reclining, the entire hemispherical or cocoon-type seat frame moves integrally, so that the slope of the seat frame is changed more smoothly.

Furthermore, in the seat assembly of the vehicle according to various exemplary embodiments of the present invention, the seat frame 110 has a shape in which a front portion is open and an internal space is formed, and the seat 120 is provided in the internal space of the seat frame 110 so that when the passenger seats on the seat 120, the seat frame 110 may wrap the rear and side surfaces of the passenger. Unlike the conventional seat including a seating portion and a backrest portion, the seat assembly of the vehicle according to various exemplary embodiments of the present invention allows the passenger to use the vehicle in a more independent space than the conventional seat by mounting the seat 120 inside the internal space of the seat frame 110. Furthermore, when the vehicle is docked with the outside and the seat assembly leaves the vehicle while the passenger is accommodated on the seat, the passenger accommodated on the seat may be externally protected from the side surface as well as from the rear surface.

Meanwhile, a seat back support is provided inside the seat frame 110 so that the seat 120 may be provided, and the seat 120 is provided on the seat back support. The seat 120 may include a seating portion provided at a lower end portion of the seat back support, a lumbar support provided at an upper end portion of the seating portion, a backrest portion provided at an upper end portion of the lumbar support, and a headrest portion provided at an upper end portion of the backrest portion. Accordingly, since the seat 120 supports a body of the passenger in various directions, the passenger may take a more comfortable posture.

Furthermore, even if the seat frame 110 is not slid, the seat 120 may be independently slid inside the seat frame 110 in a state in which the seat frame 110 is fixed, so that the slope of the seat 120 itself may be changed. By adjusting the slopes of the seat frame 110 and the seat 120, respectively, it is possible to implement more precise reclining, and the passenger may generate a more comfortable seat space for himself or herself by use of the implemented reclining.

Meanwhile, in the seat assembly of the vehicle according to various exemplary embodiments of the present invention, when the floor is inclined, the seat frame 110 is slid in an opposite direction by a slope of the floor, so that the seat 120 provided in the seat frame 110 may be maintained horizontally with respect to the ground. By mounting a gyro sensor and a controller on the support 100 and the seat frame 110, the slope is reflected in real time even if the vehicle is inclined when the vehicle shakes or crosses a speed bump, causing the connection portion of the seat frame 110 to be slid in an opposite direction thereof. As a result, the seat frame 110 is always maintained horizontally even when the vehicle is inclined, and the passenger accommodated on the seat may use the vehicle comfortably and stably.

FIG. 2A and FIG. 2B are enlarged views of a portion connecting a seat frame and a support of the seat assembly of the vehicle according to various exemplary embodiments of the present invention. In the seat assembly of the vehicle according to various exemplary embodiments of the present invention, the connection portion 200 is formed to face a plurality of directions, and as the seat frame is slid in the plurality of directions, the slope of the seat frame may be changed in the plurality of directions. For example, when the connection portion 200 is formed in three directions on the external surface of the seat frame 110, the seat frame 110 may be slid in the front and rear directions as well as a lateral direction thereof. Accordingly, the passenger may freely incline the seat frame 110 in a desired direction to use the seat in various postures.

Furthermore, in the seat assembly of the vehicle according to various exemplary embodiments of the present invention, the connection portion 200 is a guide rail formed on the seat frame, and the guide rail is formed in a curved line or a curved surface and is slid on the support, so that the slope of the seat frame 110 may be changed. Therefore, the seat frame 110 is slid along the guide rail, which is the connection portion 200, and the guide rail may not only become a sliding path, but may be configured to prevent the seat frame 110 from being separated from the support 100.

Meanwhile, in the seat assembly of the vehicle according to various exemplary embodiments of the present invention, a fixing portion 210 is provided in the support 100 or the connection portion 200, and as the fixing portion 210 selectively fixes the support 100 and the connection portion 200, the slope of the seat frame 110 may be selectively fixed according to an operation of the fixing portion 210. After the passenger adjusts the slope of the seat frame 110 or the seat 120 in a desired direction thereof, it is necessary to fix the seat frame 110 or the seat 120 so as not to move any more. For example, several holes are formed along the connection portion 200 and a hole is also formed in the support 100. The fixing portion 210 is provided in the support 100 or the connection portion 200, and the fixing portion 210 provided in one side is forked to the other side, implementing a locking mechanism.

Therefore, when the fixing portion 210 provided in the support 100 or the connection portion 200 is inserted to penetrate through both the hole of the connection portion 200 and the hole of the support 100, the seat frame 110 may be fixed so as not to move. The fixing portion 210 is forked to penetrate through not only the connection portion 200 and the support 100, but also the seat back support to thereby fix the seat frame 110, and is configured to fix the seat 120 even when the seat 120 itself is slid.

When the seat frame 110 or the seat 120 is slid again, the fixing portion 210 is pulled out of the hole, the seat frame 110 or the seat 120 is slid to adjust the slope of the seat frame 110 or the seat 120, and then the fixing portion 210 is inserted again, making it possible to fix the seat frame 110 or the seat 120.

In an exemplary embodiment of the present invention, the connection portion 200 is formed to branch from a predetermined portion to form a plurality of branched connection portions 200, as shown in FIGS. 2A and 2B, and the fixing portion 210 is positioned on the predetermined portion of the connection portion 200.

FIG. 3 is a view exemplarily illustrating that the seat assembly of the vehicle according to various exemplary embodiments of the present invention moves along a guide groove in the vehicle. In the seat assembly of the vehicle according to various exemplary embodiments of the present invention, the lower end portion of the support 100 is movable on the floor along a guide groove 500 provided on the floor of the vehicle, and the guide groove 500 may be formed to wrap the lower end portion of the support 100 to prevent the support 100 from being separated upwards.

If autonomous driving technology develops in the future, the vehicle will move without a driver. Accordingly, the passengers on board the vehicle may take a break or perform various activities while the vehicle is moving. However, an conventional vehicle has limitations in moving seats, and thus space restrictions are followed. Therefore, in the seat assembly of the vehicle according to various exemplary embodiments of the present invention, when the guide groove 500 is formed on the floor of the vehicle, the support 100 is allowed to move along the guide groove 500.

A plate with wheels is provided at the lower end portion of the support 100 so that the support 100 moves in the guide groove 500, and the guide groove 500 has a structure having a wide internal width and an upper end portion that covers the lower end portion of the support, preventing the support 100 from being separated from the floor. Therefore, the passenger may use the space of the vehicle by moving the seat of the vehicle as desired inside the vehicle.

Furthermore, one end portion of the guide groove 500 extends toward an opening portion in which a door of the vehicle is provided and is connected to an outside of the vehicle, and the seat frame 110 may move in and out of the vehicle through the one end portion of the guide groove 500. In other words, when the vehicle docks with the outside of the vehicle or when the passenger get on or off the vehicle, the entirety of the seat frame 110 moves in and out of the vehicle through the guide groove 500, so that the passenger may get on and off the vehicle while seating on the seat or take out an unnecessary seat frame 110 outside the vehicle to secure a space in the vehicle.

FIG. 4 is a view exemplarily illustrating a state in which a display and a table are exposed in the seat assembly of the vehicle according to various exemplary embodiments of the present invention. FIG. 5 is a view exemplarily illustrating a structure of the display of the seat assembly of the vehicle according to various exemplary embodiments of the present invention. FIG. 6 is a view exemplarily illustrating a state in which both side tables of the seat assembly of the vehicle according to various exemplary embodiments of the present invention are coupled. In the seat assembly of the vehicle according to various exemplary embodiments of the present invention, a display 300 may be provided on the seat frame 110, and the display 300 may be selectively exposed to have a slope which is changed according to a passenger's eye level.

The display 300 may be accommodated in the side surface of the seat frame 110 if not in use, and may be drawn from the seat frame 110 if necessary. The display 300 is formed in a curved surface and includes a display guider 310, a hinge 320, and a curved display 330 in detail. When the display 300 is drawn, the display guider 310 pushes the curved display 330 and comes out, the display guider 310 is positioned on a side surface of a head of the passenger, and the drawn curved display 330 is bent smoothly and is positioned in front of the head of the passenger. Furthermore, the hinge 320 is provided at a portion where the curved display 330 and the display guider 310 are connected, so that a slope of the curved display 330 may be adjusted. Therefore, the passenger may comfortably utilize the display by adjusting the slope of the curved display 330 according to his or her own eye level.

Meanwhile, in the seat assembly of the vehicle according to various exemplary embodiments of the present invention, the seat frame 110 is provided with a left table 410 and a right table 420, and the left table 410 and the right table 420 may be selectively exposed to form one table 400 when both tables are coupled. The left table 410 and the right table 420 are accommodated in the side surface of the seat frame 110 if not in use, and are drawn from the seat frame 110 when in use to be positioned in front of the passenger. Accordingly, the passenger may utilize a wider table by coupling the left table 410 and the right table 420.

Furthermore, the left table 410 and the right table 420 are provided with magnets 440 and 450, when the magnet 440 of one table protrudes and is attached to the magnet 450 in a groove formed in the other table, both tables are coupled, and when the magnets 440 and 450 are detached by a spring 430 provided at the rear side of the protruding magnet, both tables may be separated.

The passenger positions the left table 410 and the right table 420 in front of the passenger after drawing the left table 410 and the right table 420 from the side surface of the seat frame 110, and couples the left table 410 and the right table 420 by use of magnetic force and utilizes the coupled tables as one table 400. At the instant time, an N-pole magnet 440 is provided at an end portion of the left table 410 and an S-pole magnet 450 is provided at an end portion of the right table 420, and a groove into which the N-pole magnet 440 may be inserted is provided at the end portion of the right table 420. Therefore, when the left table 410 and the right table 420 meet, the N-pole magnet 440 of the left table 410 protrudes by magnetic force and is inserted into the groove of the right table 420, and the N-pole magnet 440 is positioned in the middle portion of the table 400. As a result, the table 400 may withstand a larger vertical load than when coupled with only the magnetic force by use of the N-pole magnet as a support.

Thereafter, when the table 400 is not required, the N-pole magnet 440 and the S-pole magnet 450 may be detached. In an exemplary embodiment of the present invention, the N-pole magnet 440 and the S-pole magnet 450 may be detached by use of the spring 430 on the rear side of the N-pole magnet 440, and the left table 410 and the right table 420 may be separated.

According to the seat assembly of the vehicle according to various exemplary embodiments of the present invention, it is possible to move inside and outside the vehicle, the passengers may take a more comfortable posture on a seat by having a slope that changes smoothly as the entire cocoon-type seat frame is slid, and it is possible to promote convenience of the passengers by having a display and a table.

In addition, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a controller, and the controller may be configured by multiple controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A seat assembly of a vehicle, the seat assembly comprising:
    a support having a lower end portion connected to a floor of the vehicle;
    a seat frame;
    a connection portion provided above the support, formed in a curved line or a curved surface and engaging the support and the seat frame, wherein the connection portion has an entire slope which is changed by a curvature of the connection portion when the connection portion is slid; and
    a seat mounted on the seat frame and configured for implementing reclining of the seat by having a slope which is changed with the seat frame when the seat frame is slid on the support,
    wherein the connection portion is formed to face a plurality of directions, and
    wherein as the seat frame is slid in the plurality of directions, the entire slope of the seat frame is changed in the plurality of directions.

2. The seat assembly of claim 1,
    wherein the connection portion is formed in a curved line or a curved surface along an external surface of the seat frame, and
    wherein the connection portion and the seat frame are integrally slid, so that the entire slope of the seat frame is changed.

3. The seat assembly of claim 1, further including a fixing portion,
    wherein the connection portion includes a plurality of holes and the support includes a hole,
    wherein the seat frame is configured to be locked when the fixing portion is inserted into one of the plurality of holes in the connection portion and the hole of the support.

4. The seat assembly of claim 3,
    wherein the fixing portion is provided in the support or the connection portion, and
    wherein as the fixing portion selectively fixes the support and the connection portion through one of the plurality of holes, the entire slope of the seat frame is selectively fixed according to an operation of the fixing portion.

5. The seat assembly of claim 1, wherein the seat frame has a hemispherical or cocoon-type structure.

6. The seat assembly of claim 1,
    wherein a front portion of the seat frame is open and an internal space is formed in the seat frame, and
    wherein the seat is mounted in the internal space of the seat frame so that when a passenger sits on the seat, the seat frame is configured to wrap rear and side surfaces of the passenger.

7. The seat assembly of claim 1,
    wherein the connection portion is a guide rail formed on the seat frame, and
    wherein the guide rail is formed in a curved line or a curved surface and is slid on the support, so that the entire slope of the seat frame is changed.

8. The seat assembly of claim 1,
    wherein a fixing portion is provided in the support or the connection portion, and
    wherein as the fixing portion selectively fixes the support and the connection portion, the entire slope of the seat frame is selectively fixed according to an operation of the fixing portion.

9. The seat assembly of claim 8,
    wherein the connection portion is formed to branch from a predetermined portion to form a plurality of branched connection portions, and
    wherein the fixing portion is positioned on the predetermined portion of the connection portion.

10. The seat assembly of claim 1,
    wherein a lower end portion of the support is movable on the floor along a guide groove provided on the floor of the vehicle, and
    wherein the guide groove is slidably engaged to the lower end portion of the support to prevent the support from being separated upwards.

11. The seat assembly of claim 10,
    wherein one end portion of the guide groove extends toward an opening portion of the vehicle in which a door of the vehicle is provided and is connected to an outside of the vehicle, and
    wherein the seat frame is movable in and out of the vehicle through the one end portion of the guide groove.

12. The seat assembly of claim 1, wherein when the floor is inclined, the seat frame is slid in a direction opposite to a slope of the floor by the slope of the floor, so that the seat provided in the seat frame is maintained horizontally with respect to a ground.

13. The seat assembly of claim 1,
wherein a display is provided on the seat frame, and
wherein the display is selectively exposed to have a slope which is changed according to a passenger's eye level.

14. The seat assembly of claim 1,
wherein the seat frame is provided with a first table and a second table, and
wherein the first table and the second table are selectively exposed to form one table when the first and second tables are coupled.

15. The seat assembly of claim 14,
wherein the first table and the second table are provided with first and second magnets, respectively,
wherein when the first magnet of the first table protrudes and is attached to the second magnet in a groove formed in the second table, the first and second tables are coupled.

16. The seat assembly of claim 14,
when the first and second magnets are detached by a spring provided at a rear side of a protruding magnet among the first and second magnets, the first and second tables are separated.

17. The seat assembly of claim 1, further including a display slidably provided on the seat frame,
wherein the display includes a display guider, a hinge, and a curved display,
wherein when the display is drawn out of the seat frame, the display guider pushes the curved display and comes out of the seat frame,
wherein the hinge is provided at a portion where the curved display and the display guider are connected, so that a slope of the curved display is adjusted.

* * * * *